(12) United States Patent
Rogers

(10) Patent No.: US 11,044,889 B1
(45) Date of Patent: Jun. 29, 2021

(54) PET MONITORING

(71) Applicant: Alarm.com Incorporated, Tysons, VA (US)

(72) Inventor: Thomas Rogers, Frederick, MD (US)

(73) Assignee: Alarm.com Incorporated, Tysons, VA (US)

( * ) Notice: Subject to any disclaimer, the term of this patent is extended or adjusted under 35 U.S.C. 154(b) by 429 days.

(21) Appl. No.: 16/139,354

(22) Filed: Sep. 24, 2018

Related U.S. Application Data

(60) Provisional application No. 62/562,072, filed on Sep. 22, 2017, provisional application No. 62/562,048, filed on Sep. 22, 2017.

(51) Int. Cl.
| | | |
|---|---|---|
| *A01K 3/00* | (2006.01) | |
| *A01K 11/00* | (2006.01) | |
| *A01K 15/02* | (2006.01) | |
| *G01S 19/16* | (2010.01) | |
| *A01K 27/00* | (2006.01) | |
| *H04W 4/80* | (2018.01) | |
| *G08B 13/12* | (2006.01) | |
| *G08B 29/18* | (2006.01) | |
| *G01S 5/00* | (2006.01) | |

(52) U.S. Cl.
CPC ............ *A01K 3/005* (2013.01); *A01K 11/008* (2013.01); *A01K 15/023* (2013.01); *A01K 27/001* (2013.01); *A01K 27/009* (2013.01); *G01S 5/0027* (2013.01); *G01S 19/16* (2013.01); *G08B 13/122* (2013.01); *G08B 29/181* (2013.01); *H04W 4/80* (2018.02)

(58) Field of Classification Search
CPC ..... A01K 3/005; A01K 11/008; A01K 15/023
USPC ....................................... 340/573.3
See application file for complete search history.

(56) References Cited

U.S. PATENT DOCUMENTS

| | | | | |
|---|---|---|---|---|
| 4,220,949 A | * | 9/1980 | Pope ................. | G08B 13/122 256/10 |
| 5,302,945 A | * | 4/1994 | Stoltenberg .......... | A01K 3/005 340/660 |
| 5,982,291 A | * | 11/1999 | Williams ............. | G08B 13/122 256/10 |
| 8,314,695 B2 | | 11/2012 | Greenberg | |
| 2005/0288007 A1 | * | 12/2005 | Benco ................ | G08B 21/0247 455/422.1 |
| 2007/0204804 A1 | | 9/2007 | Swanson et al. | |

(Continued)

*Primary Examiner* — Kerri L McNally
(74) *Attorney, Agent, or Firm* — Fish & Richardson P.C.

(57) ABSTRACT

Systems and techniques are described for monitoring an electronic pet fence at a residential facility. In some implementations, a monitoring system monitors a property that includes sensors located throughout the property that generate sensor data and an electronic fence transmitter that is configured to detect movement of an electronic device across an electronic fence. An electronic fence supervisor is configured to detect an error in the electronic fence transmitter or the electronic fence. In response to detecting the error, the electronic fence supervisor generates data indicating the error. A monitor control unit is configured to receive the data indicating the error and sensor data. Based on the data indicating the error and the sensor, the monitor control unit selects, from among multiple monitoring system actions, a monitoring system action. The monitor control unit performs the monitoring system action.

10 Claims, 7 Drawing Sheets

(56) References Cited

U.S. PATENT DOCUMENTS

| | | | |
|---|---|---|---|
| 2013/0157628 A1* | 6/2013 | Kim | A01K 27/009 455/414.1 |
| 2014/0261235 A1* | 9/2014 | Rich | A01K 27/009 119/721 |
| 2015/0206414 A1* | 7/2015 | Bishop | G08B 21/185 340/641 |
| 2016/0270366 A1* | 9/2016 | Coleman | E04H 17/003 |
| 2017/0360004 A1* | 12/2017 | Carver | A01K 15/023 |

* cited by examiner

300

---

Detect, by an electronic fence supervisor, an error in an electronic fence transmitter or an electronic fence

302

↓

In response to detecting the error, generate, by the electronic fence supervisor, data indicating the error

304

↓

Receive, by a monitor control unit, the data indicating the error and sensor data

306

↓

Based on the data indicating the error and the sensor data, select, from among multiple monitoring system actions by the monitor control unit, a monitoring system action

308

↓

Perform, by the monitor control unit, the monitoring system action

PET MONITORING

CROSS-REFERENCE TO RELATED APPLICATIONS

This application claims the benefit of U.S. Provisional Application No. 62/562,072, filed Sep. 22, 2017 and U.S. Provisional Application 62/562,048, filed Sep. 22, 2017, which are both incorporated herein by reference.

TECHNICAL FIELD

This specification relates generally to electronic pet fences.

BACKGROUND

Pet fences are designed to keep pets or other domestic animals within a set of predefined boundaries without the use of a physical barrier. A domestic animal being kept within the pet fence typically wear an electronic collar. The electronic collar delivers a shock to the domestic animal if a warning sound is ignored and the domestic animal nears too close to the predefined boundary.

SUMMARY

Many families utilize electronic pet fences to ensure their pets are prevented from leaving a property and/or certain sections of a residential property. Additionally, electric fences may often be used for ensuring livestock are secure in a property. Current electronic and electric pet fences only offer a local alert (sound) when a wire break exists and no alert is provided in the event the transmitter become disconnected from electrical power. This issue offers the pet owner no peace of mind their corresponding electronic fence is working. Additionally, this issue is only realized after the pet has vacated the protected area. The Electronic Fence Supervisor (EFS) will alert the pet owner of a failure of power and/or line integrity in real time.

The subject matter of the present disclosure is related to techniques of an integrated security environment for monitoring an electronic pet fence at a residential facility. The residential facility may include a hub, sensor, or another device, such as an Electronic Fence Supervisor (EFS), for monitoring the electronic pet fence. The EFS can provide power to an Electronic Fence Transmitter (EFT) for providing power to the electronic pet fence. The electronic pet fence can include a wire loop, above or below ground, acting as a radio signal loop and ensuring one or more pets remain interior to the electronic pet fence. Should a pet move too close to the wire loop or cross over the wire loop corresponding to the electronic pet fence, a pet collar attached to the pet may provide a shock to the pet indicating proximity to the pet fence boundary installed on the residential property. Additionally, techniques are described for tracking a pet associated with a monitored property using an electronic pet collar. The electronic pet collar is in communication with a control unit that manages the security system at the monitored property or with the EFS.

The EFS can be plugged in to an electrical outlet at the residential property to provide power to the EFT. Additionally, the EFS can include a power supply that will enable it to provide power to the EFT during one or more external events, such as a power failure. Alternatively, the EFS may be powered by one or more solar panels. The EFS can also indicate that power provided to the EFS or power utilized by the EFT has been interrupted by way of an audible sound, such as a beeping noise. Additionally, should the EFS recognize power received or power utilized by the EFT be interrupted, the EFS can provide an indication to a property owner corresponding to the residential property.

In one general aspect, a method is performed by one or more computers of a monitoring system. The method includes: generating sensor data; detecting movement of an electronic device across an electronic fence; detecting an error in the electronic fence transmitter or the electronic fence; in response to detecting the error, generating data indicating the error; and receiving the data indicating the error and the sensor data; based on the data indicating the error and the sensor, selecting, from among multiple monitoring system actions, a monitoring system action; and perform the monitoring system action.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, generating image data; receiving data indicating the error and the sensor data by receiving the data indicating the error and the sensor data that indicates movement in a particular area near the electronic fence; determining that the camera is trained on the particular area near the electronic fence; obtaining the image data; selecting a monitoring system action by selecting an action to transmit the image data to a resident of the property; and performing the monitoring system action by transmitting the image data to the resident of the property.

In some implementations, the method further includes: connecting to the electronic fence in series, and providing power to the electronic fence.

In some implementations, the method further includes: generating radio frequencies that interact with the electronic device.

In some implementations, the method further includes: detecting an error in the electronic fence transmitter or the electronic fence by detecting a break in a wire of the electronic fence; generating data indicating the error by generating data indicating the break in the wire of the electronic fence; receiving the data indicating the error and the sensor data by receiving the data indicating the break in the wire of the electronic fence; selecting the monitoring system action based on the data indicating the break in the wire of the electronic fence and the sensor data.

In some implementations, the method further includes: detecting an error in the electronic fence transmitter or the electronic fence by determining that an amount of power consumed by the electronic fence transmitter does not satisfy a power consumption threshold; generating data indicating the error by generating data indicating that the amount of power consumed by the electronic fence transmitter does not satisfy the power consumption threshold; receiving the data indicating the error and the sensor data by receiving the data indicating that the amount of power consumed by the electronic fence transmitter does not satisfy the power consumption threshold; selecting the monitoring system action based on the data indicating that the amount of power consumed by the electronic fence transmitter does not satisfy the power consumption threshold.

In some implementations, the method further includes: based on the sensor data, determining that pet door of the property has been opened; and selecting the monitoring system action based on determining that the pet door of the property has been opened and the data indicating the error in the electronic fence transmitter or the electronic fence.

In some implementations, the multiple monitoring system actions include providing a notification to a resident of the property; generating an alarm; activating a camera that is trained on an area of electronic fence; and identifying image data that was captured when the error in the electronic fence transmitter or the electronic fence was detected.

In some implementations, the method further includes: receiving a request to deactivate the electronic fence; in response to the request to deactivate the electric fence, ceasing providing power to the electronic fence transmitter; and after a predetermined period of time has elapsed, providing power to the electronic fence transmitter.

In some implementations, the predetermined period of time is based on: an arming status of the monitoring system; the sensor data; or a request from a resident of the property.

In one general aspect, a method is performed by one or more computers of a monitoring system. The method includes: affixing a pet collar device to a pet of the monitored property; transmitting, to the pet collar device, a first communication; receiving, from the pet collar device, a second communication that the pet collar device transmits in response to the first communication; based on receiving the second communication, determining that the pet collar device is within a threshold distance of the property; after determining that the pet collar device is within the threshold distance of the property, transmitting, to the pet collar device, a third communication; after a predetermined has elapsed, determining that the pet collar device did not transmit a communication in response to the third communication; and based on determining that the pet collar device did not transmit a communication in response to the third communication, determining that the pet collar device is not within the threshold distance of the property; receiving, from the electronic fence supervisor, data indicating that the pet collar device is not within the threshold distance of the property; and based on receiving the data indicating that the pet collar device is not within threshold distance of the property, performing a monitoring system action.

In some implementations, the method further includes generating image data; performing a monitoring system action by activating the camera.

In some implementations, the method further includes: transmitting, to the pet collar device, a first communication via short-range radio communication; and receiving, from the pet collar device, a second communication that the pet collar device transmits in response to the first communication via the short-range radio communication.

In some implementations, the method further includes: performing a monitoring system action by initiating a fourth communication with the pet collar device.

In some implementations, the method further includes initiating cellular communication with the pet collar device.

In some implementations, the method further includes: receiving, from the pet collar device, data indicating a location of the pet collar device; and communicate a notification to a user device of the resident of the property that indicates that the pet collar device is not located within the threshold distance of the property and that includes the data indicating the location of the pet collar device.

In some implementations, the method further includes generating image data; transmitting, to the pet collar device, a fourth communication; receiving, from the pet collar device, a fifth communication that the pet collar device transmits in response to the fourth communication; based on receiving the fifth communication, determining that the pet collar device is within a threshold distance of the property; receiving, from the electronic fence supervisor, data indicating that the pet collar device is within the threshold distance of the property; receiving, from the camera, the image data; based on the image data, determining that the pet is not within the threshold distance of the property; and based on determining that the pet is not within the threshold distance of the property and based on the data indicating that the pet collar device is within the threshold distance of the property, performing a monitoring system action by communicating a notification to a user device of the resident of the property indicating that the pet collar device was likely removed from the pet, and the pet is likely not at the property.

In some implementations, the method further includes: transmitting, to the pet collar device, a fourth communication; after a predetermined time has elapsed, determining that the pet collar device did not transmit a communication in response to the fourth communication; transmitting, to the pet collar device, a fifth communication that is different than the fourth communication; receiving, from the pet collar device, a sixth communication that the pet collar device transmits in response to the fifth communication; and based on receiving the fifth communication, determining that the pet collar device is within a threshold distance of the property.

In some implementations, the method further includes: determining that an armed status of the monitoring system is armed away or armed stay; and increasing a length of the predetermined time period based on the monitoring system being armed away or armed stay.

In some implementations, the method further includes: determining that an armed status of the monitoring system is unarmed; decreasing a length of the predetermined time period based on the monitoring system being unarmed.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart of example processes for performing a system action at a monitored property based on an error detected by an electronic fence supervisor.

DETAILED DESCRIPTION

An electric pet fence is an electronic system designed to keep a pet or other domestic animal within a set of predefined boundaries without the use of a physical barrier. A mild electronic shock is delivered by an electronic collar to the pet when the pet approaches the boundaries of the wiring of the fence. Pet fences help pet owners keep their pets safe, however, pet fences may fail and they do not prevent pets from being stolen. In the event that an electric pet fence fails or a pet is stolen the pet owner has no means of being notified of the occurrence and has no means of tracking their pet.

Techniques are described for tracking a pet associated with a monitored property equipped with a pet fence. The pet may be equipped with an electronic collar device that is configured to communicate with a pet collar hub device at the monitored property. The electronic pet collar device may transmit a small shock to the pet when it is too close to the boundary fence. The electronic pet collar device may attempt to communicate with the pet collar hub device on a periodic basis, when communication with the pet collar hub device fails, the electronic pet collar communicates its GPS coordinates to a monitoring server. The electronic pet collar device may fail to communicate with the pet collar hub device when the pet has moved beyond a threshold distance from the monitored property, indicating either that the pet fence was shut off or failed and allowed the animal to roam outside of the threshold distance, or the pet was stolen from the monitored property. The monitoring server in turn communicates the GPS coordinates to a resident at the monitored property.

Figure 1:
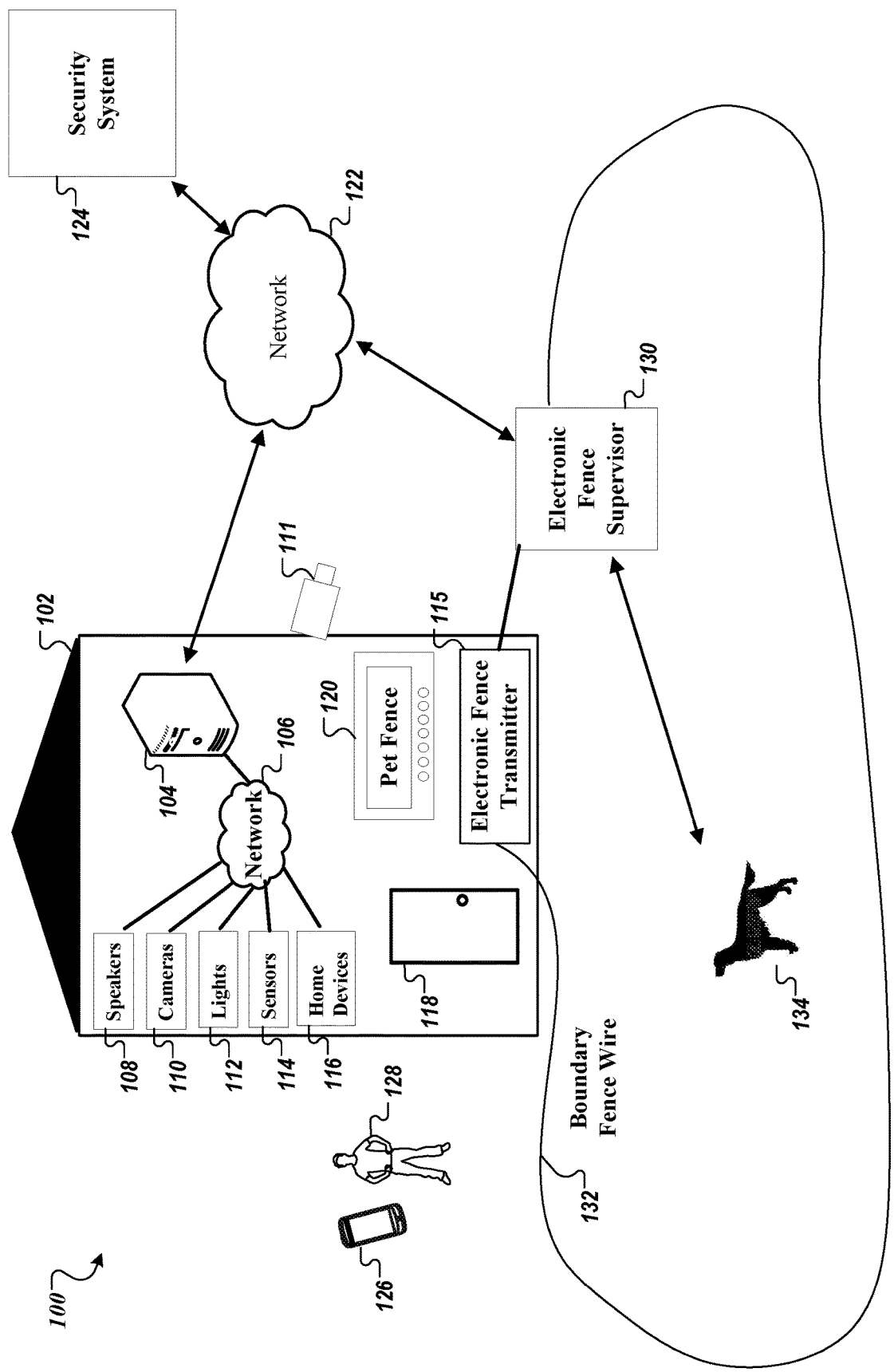
FIG. 1 is a contextual diagram of an example system of an integrated security environment for monitoring an electronic pet fence.

FIG. 1 is a contextual diagram of an example system 100 of an integrated security environment for monitoring an electronic pet fence at a residential facility. Though system 100 is shown and described including particular set of components including a control unit 104, network 106, speakers 108, cameras 110, lights 112, sensors 114, home devices 116, network 106, network 122, and security system 124, the present disclosure need not be so limited. For instance, in some implementations only a subset of the aforementioned components may be used by the integrated security environment for monitoring the electronic pet fence of the residential facility. As an example, there may be implementations that do not use the speakers 108. Similarly, there may be implementations that the security system 134 is stored in the control unit 104. Yet other alternative exemplary systems also fall within the scope of the present disclosure such as a system that does not use a control unit server 104. For these reasons, the system 100 should not be viewed as limiting the present disclosure to any particular set of necessary components.

As shown in FIG. 1, an electronic pet fence 132 at a residential facility 102 (e.g., a home) is monitored by an electronic fence supervisor (EFS) 130 for ensuring a securely monitored pet, such as dog 134. The EFS 130 communicates with a control unit server 104 that includes components within the residential facility 102 for providing an alert to the property owner 128. The components within the residential facility 102 may include one or more speakers 108, one or more cameras 110, one or more lights 112, one or more sensors 114, and one or more home devices 116. The one or more cameras 110 may include video cameras that are located at the exterior of the residential facility 102 near the front door 118, such as video camera 111, as well as located at the interior of the residential facility 102 near the front door 120. The one or more sensors 114 may include a motion sensor located at the exterior of the residential facility 102, a front door sensor that is a contact sensor positioned at the front door 120, and a lock sensor that is positioned at the front door 120. The contact sensor may sense whether the front door 120 is in an open position or a closed position. The lock sensor may sense whether the front door 120 is in an unlocked position or a locked position. The one or more home devices 116 may include home appliances such as a washing machine, a dryer, a dishwasher, an oven, a stove, a microwave, and a laptop, to name a few examples. The control unit server 104 may provide an indication to the EFS 130 to turn off or turn on power at the electronic fence transmitter (EFT) 115 based on data provided by one or more of the cameras 110, the one or more sensors 114, and the one or more home devices 116.

The control unit server 104 communicates over a short-range wired or wireless connection over network 106 with connected devices such as each of the one or more speakers 108, one or more cameras 110, one or more lights 112, one or more sensors 114a, one or more home devices 116 (washing machine, a dryer, a dishwasher, an oven, a stove, a microwave, a laptop, etc.), and the electronic fence supervisor 130 to receive sensor data descriptive of events detected by the one or more cameras 110a, the one or more sensors 114, the one or more home devices 116, the electronic fence supervisor 130, and the electronic fence transmitter 115 in the residential facility 102. In some implementations, the connected devices may connect via Wi-Fi, Bluetooth, or any other protocol used to communicate over network 106 to the control unit server 104. Additionally, the control unit server 104 communicates over a long-range wired or wireless connection with a security system 124 over network 122 over one or more communication links. In some implementations, the security system 124 is located remote from the residential facility 102, and manages the monitoring at the residential facility 102, as well as other (and, perhaps, many more) monitoring systems located at different properties that are owned by different users. In other implementations, the security system 124 is located locally at the residential facility 102. The security system 124 communicates bi-directionally with the control unit server 104. Specifically, the security system 124 receives sensor data descriptive of events detected by the sensors included in the monitoring system of the residential facility 102. Additionally, the security system 124 transmits instructions to the control unit server 104 for particular events.

In the example shown in FIG. 1, a property owner 128 may place a pet, such as a dog 134, inside a boundary fence wire 132 in proximity to the residential facility 102 (e.g., home). In some implementations, the boundary fence wire 132 may encompass the residential facility 102. In other implementations, the boundary fence wire 132 may be in an area adjacent to the residential facility 102. Still, in other implementations, the boundary fence wire 132 may be enclosed in a portion inside residential facility 102. The property owner 128 may then power on the EFS 130 to provide power to the electronic fence transmitter (EFT) 115. The EFT 115 powers the boundary fence wire 132. In doing this, the boundary fence wire 132 becomes an electrical wire that generates radio frequencies. The EFS 130 monitors the radio frequencies generated by the boundary fence wire 132. In some implementations, the radio frequencies received by the EFS 130 may be in the form of amplitude modulation (AM) or frequency modulation (FM), depending on the manufacturer of the EFT 115.

In some implementation, the property owner 128 may interact with a client device 126 to activate a signature profile, such as "pet monitoring" for the residential facility 102, once a pet is place inside the boundary fence wire 132. The client device 126 may display a web interface, an application, or a device specific for a smart home system. The client device 126 can be, for example, a desktop computer, a laptop computer, a tablet computer, a wearable computer, a cellular phone, a smart phone, a music player, an e-book reader, a navigation system, a security panel, or any other appropriate computing device. In some implementations, the client device 126 may communicate with the control unit server 104 using the network 106 over one or more communication links. The network 106 may be wired or wireless or a combination of both and can include the Internet.

In some implementations, user 128 may communicate with the client device 126 to activate a signature profile for the residential facility 102. To illustrate, user 128 may first instruct the control unit server 104 to set a signature profile corresponding to pet monitoring at the residential facility 102. For example, user 128 may use a voice command to say "Smart Home, monitor pet fence." The voice command may include a phrase, such as "Smart Home" to trigger the client device 126 to actively listen to a command following the phrase. Additionally, the phrase "Smart Home" may be a predefined user configured term to communicate with the client device 126. The client device 126 can send the voice command to the control unit server 104 over the network 106. The control unit server 104 may notify the security system 124 that residential facility 102 is to monitor the pet fence 132. In addition, the control unit 104 may set associated parameters in response to receiving the voice command. Moreover, the control unit 104 can send back a confirmation to the client device 126 in response to arming the residential facility 102 for pet fence monitoring and setting the associated parameters. For example, the control unit server 104 may send back a response to display a message on the client device 126 that says "Smart Home, monitoring pet fence."

In some implementations, in order for the control unit server 104 to allow property owner 128 and others to activate a signature profile case for the residential facility 102, the property owner 128 and others may define and store signature profiles in the control unit 104. In other implementations, the property owner 128 and others may define and store signature profiles in the security system 124. The signature profile may be associated with each user and allow for various use cases of the devices in the residential facility 102. Each of the signature profiles can be associated with one user, such as property owner 102. For example, property owner 102 may create a signature profile for monitoring the pet fence at the residential facility 102.

In some implementations, property owner 128 may store one or more parameters associated with a use case in his or her signature profile. For instance, the one or more parameters for each use case may set a volume level in decibels (dB) of the speakers 108, an aperture amount for the cameras 110, a brightness intensity level of the lights 112, turning on or off home devices 116 such as television, laptop, one or more fans, setting a specific temperature of a thermometer, opening or closing the shades of window a particular amount, setting the threshold level for the EFT 115 for detecting variations in the boundary fence wire 132, and any other parameters to describe the use case. For example, user 128 may create a signature profile with a use case for "monitoring the pet fence." The user 128 may define the one or more parameters to set a volume level of −3 dB for the one or more speakers 108, an aperture of f/16 for the one or more cameras 110, 0 lumens brightness for the one or more lights 112, turning off all home devices 116, setting the thermometer to 68 degrees Fahrenheit, fully opening the blinds of the one or more windows, and setting a threshold level of 10 V of voltage for the EFT 115. Additionally, the control unit server 104 may increase the sensitivity associated with each of the one or more sensors 114 for the "monitoring the pet fence" use case. Specifically, control unit server 104a may increase the sensitivity for the front door sensor, the lock sensor, and the motion sensor by a predetermined factor so that smaller movements of the front door or near the boundary fence wire 132 trigger an alarm event. For example, the sensitivity may be increased by a factor of five.

In some implementations, the control unit server 104 may send a response to display a message on the client device 126 that says "Smart Home, monitoring pet fence" once the control unit server 104 sets the parameters. In addition, the control unit server 104 transmits a message to the security system 124 that the residential facility 102 finished arming.

In some implementations, the one or more parameters for the signature profile for "monitoring the pet fence" may include one or more rules defined by the property owner 128. The one or more rules may be stored in the signature profile in the control unit server 104. For example, the one or more rules may include a notification status when an EFS 130 is without power such as "Pet Fence Failure", how to notify property owner 128 of the power failure such as through client device 126 or the alarm panel 120, a maximum number of pets to be monitored in the boundary fence wire 132, whether to record video in an area surrounding or encompassing the boundary fence wire 132 when the EFS 130 is powered on, whether to record video in the area surrounding or encompassing the boundary fence wire 132 when the EFS 130 loses power, and an adjustable length of time to wait before powering the EFT 115 following a power down. In another example, the one or more rules may include whether to notify security system 124 in response to the EFS 130 detecting a power failure. Additionally, the one or more rules may include whether the control unit server 104 should notify the property owner 128 of one or more events occurring in the residential property 102 when the EFS 130 is without power. For example, if the front door 118, the windows, a pet door, or the garage door is open when the EFS 130 is without power, the control unit server 104 should notify the property owner 128 to close the opened door or window to ensure pet 134 does not escape. In another example, each of the pets, such as dog 134, may wear a collar that includes an electronic tracking device. The one or more rules may indicate how many collars the control unit server 104 monitors depending on the number of pets that property owner 128 places inside of the boundary fence wire 132. Other rules are possible; the aforementioned list illustrates of possible examples of the rules.

In some implementations, the property owner 128 can power on the EFS 130 that is connected in series with the boundary fence wire 132 and the EFT 115. In some implementations, the EFS 130 is powered by a plug into an electrical outlet in the residential facility 102. The EFS 130 provides power to the EFT 115 in the form of AC voltage. For example, the EFS 130 provides 110 Volts Root Mean Square (RMS) to power to the EFT 115. The EFS 130 monitors a power level received from the electrical outlet, the power the EFS 130 provides to the EFT 115. Additionally, the EFS 130 monitors the power being consumed by the EFT 115 by way of the EFS 130 being connected in series with the boundary fence wire 132 and the EFT 115. In some implementations, the EFS 130 provides an indication the control unit server 104 that the EFT 115 is powered on. In addition, the indication includes a status of the power level received from the electrical outlet, the power provided by the EFS 130 to the EFT 115, and the power being consumed by the EFT 115 around the boundary wire fence 132. For example, the EFS 130 provides a status of 120 V as received from the electrical outlet, 110 V provided to the EFT 115, and 100 V consumed by the EFT 115 around the boundary wire fence 132, to the control unit server 104.

In some implementations, the EFS 130 may include a backup power supply. The EFS 130 may utilize the backup power supply to provide power to the EFT 115 in the case of a power failure at the electrical outlet utilized by the EFS 130. The backup power supply in the EFS 130 can provide 110 V to the EFT 115 for a predetermined period of time. In this instance, the predetermined period of time is dependent upon an amount of power stored in the backup power supply. In other implementations, the EFS 130 may be powered by one or more solar panels.

In some implementations, the EFS 130 may provide a notification to the property owner 128 in response to detecting an interruption in power. If the EFS 130 detects an interruption, such as a decrease or a loss in power in at least one of power received from the electrical outlet, power provided to the EFT 115, or power consumed by the EFT 115, the EFS 130 can send the notification to the property owner 128. For example, the decrease or loss in power may be caused by the residential property 102 losing power. In another example, the decrease or loss in power can be caused by a failed electrical outlet at the residential property 102. In another example, the decrease or loss in power can be caused by a faulty EFS 130 device. In another example, the decrease or loss in power can be caused by a broken boundary fence wire 132. In response, the EFS 130 can send a notification to the control unit server 104 over the network 122. The control unit server 104 can send the notification to the client device 126 of the property owner 128 indicating EFS 130's loss in power. For example, the notification provided by the control unit server 104 to the client device 126 may display a message on the client device 126 that recites "Pet Fence Failure." Alternatively, the EFS 130 may produce a local audible alert sound indicating that power has been disrupted or that the EFS 130 has lost integrity or power. The notification may be a text message, such as an SMS message, an auditory message, or a visual message. In other implementations, the control unit server 104 may provide a notification to the alarm panel 120 indicating that the EFT 115 has lost power. The alarm panel 120 may display a message that recites "PET FENCE," as shown in FIG. 1. The property owner 128 may interact with the alarm panel 120 to indicate to the control unit server 104 it properly received the indication. For instance, the property owner 128 may select a button, such as "Enter," to indicate to the alarm panel 120 that the property owner 128 identifies the issue. The alarm panel 120 may transmit a notification to the control unit server 104 in response to the property owner 128 interacting with the alarm panel 120. Communicating between devices provides allows various devices to know the status of one another.

In some implementations, the EFS 130 may include a temporary bypass feature that allows a pet owner, such as property owner 128, to temporarily turn off the power supplied to the boundary fence wire 132. The temporary bypass feature instructs the EFS 130 to stop providing power to the EFT 115. This causes a chain reaction with the EFT 115 to stop providing power to the boundary fence wire 132 and allows a pet 134 to roam over the boundary created by radio signals of the boundary fence wire 132. For instance, the radio signals generated by the electricity flowing through the boundary fence wire 132 interacts with the electronic device attached to the collar of pet 134. In particular, the electronic device in the collar shocks the dog 134 if the electronic device in the collar recognizes the radio signals generated by the boundary fence wire 132. The recognition indicates the dog 134 is too close to the boundary fence wire 132. If the radio signals are turned off (e.g., the EFS 130 stops providing power to the EFT 115), the dog 134 can freely roam and cross over the boundary fence wire 132 without being shocked. The property owner 128 may turn off the power supplied by the EFT 115 through an application on the client device 126. The application may send a signal to the control unit server 104 instructing the EFT 115 to shut down in response to the property owner 128 pressing a "power down" or similar feature on the client device application. In response, the control unit server 104 may send a signal to the EFT 115 over the network 122 through EFS 130 instructing the EFT 115 to power down.

In some implementations, the property owner 128 has to manually disconnect the EFT 115 from power to shut down the EFT 115. This system provides a benefit in a remote power down feature that does not require the property owner 128 to manually disconnect the EFT 115 for power down. Another added benefit of this system is that the property owner 128 does not have to remove the collar for the dog 134 each time the owner plans to take the dog outside of the boundary fence wire 132. For example, the property owner 128 may want to take dog 134 on a walk without having to remove the pet collar. In another example, the pet owner 128 may desire to take dog 134 in a car to the veterinarian without having to remove the pet collar. The property owner 132 can remotely shut down the power provided to the EFT 115 and retrieve the dog 134 without removing the pet collar. Upon returning to the residential property 102, the property owner 128 can put the dog 134 inside of the boundary fence wire 132 and power on the EFT 115 through the application on the client device 126. Turning on the power to the EFT 115 using the client device 126 provides the property owner 128 flexibility to control EFT 115 from any location they so desire.

In some implementations, the temporary bypass feature can include an adjustable auto reset feature that prevents the property owner 128 from forgetting to reactivate the EFT 115. The property owner 128 can adjust a length of time in which the EFS 130 will reactivate once initially powered down. For example, the length of time may be 5 minutes, 30 minutes, 1 hour, 1 day, etc. The property owner 128 can adjust the length of time through the application accessed on the client device 126. The adjustable length of time will be stored in the memory of the EFS 130 and the control unit server 104. In this instance, if property owner 128 sets the adjustable length of time to be 1 hour, the control unit server 104 or the EFS 130 will transmit a notification to the EFT 115 to power on once 1 hour elapses following a power down of the EFT 115. However, if property owner 128 powers on the EFT 115 before the 1 hour elapses following a power down of the EFT 115, the EFS 130 or the control unit server 104 will not send the notification to the EFT 115. In some implementations, the length of time can be set by the control unit server 104. The control unit server 104 can set the length of time based on an arming status of the residential property 102 or sensor data received from the sensors 114. In particular, when the control unit server 104 determines the residential property 102 is in an unarmed state, the control unit server 104 sets the length of time to be a long amount of time, such as 5 minutes. If the control unit server 104 determines the residential property 102 is in an armed state, the control unit server 104 sets the length of time to be a short amount of time, such as 30 seconds. If the control unit server 104 determines from sensor data received from the sensors 114 a type of unusual activity, such as a front door open while the residential property 102 is armed, then the control unit server 104 sets the length of time to be a short amount of time. The control unit server 104 can detect other data from the sensors that indicate unusual activity, such as, for example, an opening of the one or more windows or movement in the living room while the residential property 102 is armed.

In some implementations, the EFS 130 and the EFT 115 may be utilized in conjunction with the control unit server 104 and the corresponding sensors. For instance, in the likelihood that the EFS 130 has lost power and cannot provide power to the EFT 115, the EFS 130 can notify the control unit server 104 of the power loss. The control unit server 104 can send a notification to the property owner 128's client device 126 indicating a power failure of the EFS 130. In addition to recognizing a loss in power failure, the control unit server 104 can notify the property owner 126 of one or more additional events in order to ensure dog 134 remains securely monitored. For example, if contact sensor attached to the front door 118 indicates that front door 118 is open while the EFS 130 is without power, the control unit server 104 can send a notification to the property owner 128 that front door 118 needs to be closed while the EFS 130 is without power. In another example, this may be the case if one or more windows in the residential property 102 are open, or a garage door attached to the residential property owner 102.

In some implementations, the control unit server 104 may utilize the EFS 130 in conjunction with the outdoor camera 111 to improve monitoring of the dog 134. For instance, the control unit server 104 can stream the video feed from the outdoor camera 111 monitoring area surrounding and encompassing the boundary fence wire 132 to the property owner 128's client device 126. In addition, the control unit server 104 may store the live video feed in memory for retrieval at a later point in time. In some implementations, if power provided to or provided by the EFS 130 is interrupted while the pet 134 exists inside the boundary fence wire 132, the property owner 128 can review the video stream recorded and provided by the outdoor camera 111 to determine a cause of the failure. In addition, the property owner 128 can review the video stream to determine what dog 134 did at the time of power failure. For example, the property owner 128 can determine a direction dog 134 ran away. In another example, the property owner 128 can determine a cause of the power failure supplied to or provided by the EFS 130, such as an outside individual cutting the boundary fence wire 132. This information is useful in helping the property owner 128 monitor the EFS 130.

Figure 2:
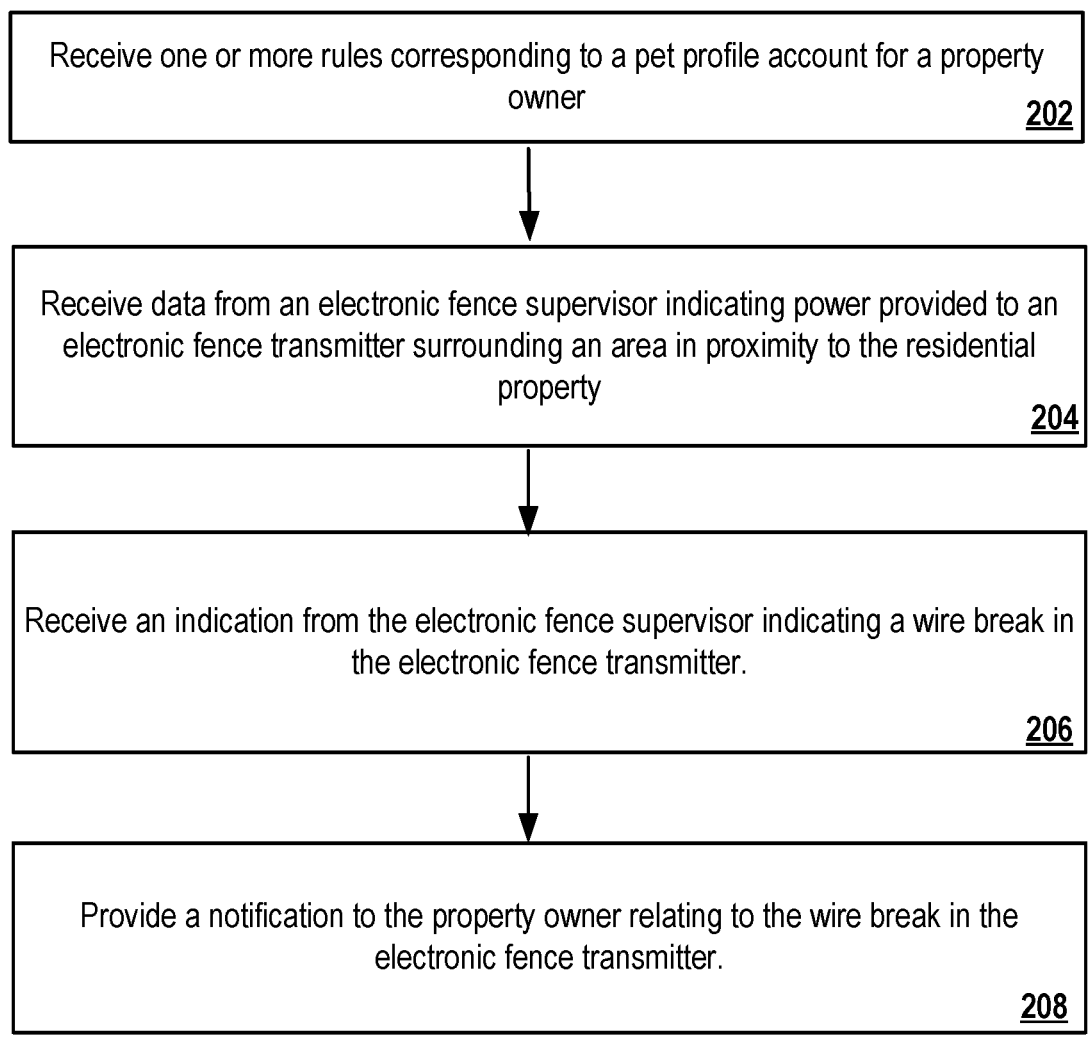
FIG. 2 is a flowchart of example processes for providing an alert based on a determination that a particular event related to the electronic pet fence has occurred.

FIG. 2 is a flowchart of example processes for providing an alert based on a determination that a particular event related to the electronic pet fence has occurred. Generally, the process 200 includes receiving one or more rules corresponding to a pet profile account for a property owner; receiving data from an electronic fence supervisor indicating power provided to an electronic fence transmitter surrounding an area in proximity to the residential property; receiving an indication from the electronic fence supervisor indicating a likelihood of a wire break connected to the electronic fence transmitter; and, providing a notification to the power owner relating to the wire break connected to the electronic fence transmitter.

During 202, the control unit server 104 receives one or more rules corresponding to a pet profile account for a property owner. The one or more rules may be stored in the signature profile, such as the "monitoring the pet fence" signature profile, in the control unit server 104. For example, the one or more rules may include a notification status when an EFS 130 is without power such as "Pet Fence Failure", how to notify property owner 128 of the power failure such as through client device 126 or the alarm panel 120, a maximum number of pets to be monitored in the boundary fence wire 132, whether to record video in an area surrounding or encompassing the boundary fence wire 132 when the EFS 130 is powered on, whether to record video in the area surrounding or encompassing the boundary fence wire 132 when the EFS 130 loses power, and an adjustable length of time to wait before powering the EFT 115 on following a power down.

During 204, the control unit server 104 receives data from an electronic fence supervisor 130 indicating power provided to an electronic fence transmitter 115 surrounding an area in proximity to the residential property 102. In some implementations, the EFS 130 provides an indication the control unit server 104 that the EFT 115 is powered on. In addition, the indication includes a status of the power level received from the electrical outlet, the power provided by the EFS 130 to the EFT 115, and the power being consumed by the EFT 115 around the boundary wire fence 132. For example, the EFS 130 provides a status of 120 V as received from the electrical outlet, 110 V provided to the EFT 115, and 100 V consumed by the EFT 115 around the boundary wire fence 132, to the control unit server 104.

During 206, the control unit server 104 receives an indication from the electronic fence supervisor 130 indicating a likelihood of a wire break connected to the electronic fence transmitter 115. If the EFS 130 detects an interruption, such as a decrease or a loss in power in at least one of power received from the electrical outlet, power provided to the EFT 115, or power consumed by the EFT 115, the EFS 130 can send the notification to the property owner 128. For example, the decrease or loss in power may be caused by the residential property 102 losing power. In another example, the decrease or loss in power can be caused by a failed electrical outlet at the residential property 102. In another example, the decrease or loss in power can be caused by a faulty EFS 130 device. In another example, the decrease or loss in power can be caused by a broken boundary fence wire 132. In response, the EFS 130 can send a notification to the control unit server 104 over the network 122.

During 208, the control unit server 104 provides a notification to the property owner 128 relating to likelihood of the wire break connected to the electronic fence transmitter 115. The control unit server 104 can send the notification to the client device 126 of the property owner 128 indicating EFS 130's loss in power. For example, the notification provided by the control unit server 104 to the client device 126 may display a message on the client device 126 that recites "Pet Fence Failure." In other implementations, the control unit server 104 may provide a notification to the alarm panel 120 indicating that the EFT 115 has lost power. The alarm panel 120 may display a message that recites "PET FENCE," as shown in FIG. 1. The property owner 128 may interact with the alarm panel 120 to indicate to the control unit server 104 it properly received the indication. For instance, the property owner 128 may select a button, such as "Enter," to indicate to the alarm panel 120 that the property owner 128 identifies the issue.

FIG. 3 is a flowchart 300 of example processes for performing a system action at a monitored property based on an error detected by an electronic fence supervisor. Generally, the process 300 includes detecting, by an electronic fence supervisor, an error in an electronic fence transmitter or an electronic fence; in response to detecting the error, generating data indicating the error; receiving, by a monitor control unit, the data indicating the error and the sensor data; based on the data indicating the error and the sensor data, selecting, from among multiple monitoring system actions by the monitor control unit, a monitoring system action; and performing, by the monitor control unit, the monitoring system action.

During 302, an electronic fence supervisor detects an error in an electronic fence transmitter or an electronic fence. The electronic fence supervisor 130 can detect an interruption in power with the electronic fence transmitter (EFT) 115 or the electronic fence wire 132, such as a decrease or loss in power. The interruption can be caused by at least one of power interrupted from the electrical outlet, power provided to the EFT 115, or power consumed by the EFT 115 surrounding the electronic fence wire 132. For example, the decrease or loss in power may be caused by the residential property 102 losing power. In another example, the decrease or loss in power can be caused by a failed electrical outlet at the residential property 102. In another example, the decrease or loss in power can be caused by a faulty EFS 130 device. In another example, the decrease or loss in power can be caused by a broken boundary fence wire 132.

During 304, in response to detecting the error, the electronic fence supervisor generates data indicating the error. First, by placing the EFS 130 in series with the EFT 115, if the EFS 130 cannot communicate with the EFT 115, then the EFS 130 can determine that the electrical outlet from the monitored property is not providing power or sufficient power to the EFT 115. Second, the EFS 130 can determine if it is providing sufficient power to the EFT 115. Third, if the EFS 130 can communicate with the EFT 115, the EFS 130 can request an amount of power the EFT 115 has received and for an amount of power the EFT 115 is consuming. The EFS 130 can request for the amount of power the EFT 115 has received or is consuming over a predetermined interval. The EFS 130 can define a predetermined time over a previous hour, a previous day, a previous week, or a previous month, to name a few examples. The EFS 130 can receive a response from the EFT 115 that indicates a received or consumed power level over a predetermined time and generate data to indicate the error. The data can include a power level from the EFT 115, a power level provided by the EFS 130, a power level indicating an amount of power the EFS 130 receives from the electrical outlet, and a corresponding description of the issue. The corresponding description can include a notification from the EFS 130 that aids the control unit server 104 in determining the error. For example, the description can recite "ELECTRICAL OUTLET FAILURE" or "EFT POWER CONSUME FAILURE," to name a few examples. The EFS 130 can transmit the data that includes the power level from the EFT 115, the power level provided by the EFS 130, the power level indicating the amount of power the EFS 130 received from the electrical outlet, and a corresponding description of the issue to the control unit server 104.

During 306, a monitor control unit receives the data indicating the error and sensor data. The control unit server 104 receives the data from the EFS 130 and sensor data from the sensors in the residential property 102. The control unit server 104 can request for sensor data from the cameras 110, the sensors 114, and the home devices 116 in response to receiving the data from the EFS 130. Alternatively or additionally, the control unit server 104 can use the sensor data it most recently received in response to receiving the data from the EFS 130. The sensor data can include an indication that the front door 118 or a pet door is either opened, closed, locked, or unlocked, one or more windows in the monitored property are opened or closed, a garage door is opened or closed, video camera footage from a video camera 111 found monitoring the boundary fence wire 132, and data from one or more pet collars, to name a few examples.

DIn addition to recognizing a loss in power failure with the EFS 130, EFT 115, or the electronic boundary fence wire 132, the control unit server 104 can notify the property owner 126 of one or more additional events in order to ensure a pet, such as dog 134, remains securely monitored. For example, if contact sensor attached to the front door 118 indicates that front door 118 is open while the EFS 130 is without power, the control unit server 104 can send a notification to the client device 126 of the property owner 128 and the alarm panel 120 that front door 118 needs to be closed while the EFS 130 is without power. Additionally, the situation can apply if a contact sensor attached to a garage door, a basement door, or one or more windows indicates the door or windows are open.

In some implementations, the control unit server 104 can receive video feed from outdoor camera 111 in response to receiving the data from the EFS 130. The video feed can be fed to the control unit server 104 in real time or after the camera 111 has recorded the video. The camera 111 can be monitoring the area surrounding and encompassing the boundary fence wire 132 for monitoring the one or more pets at the residential facility 102. The control unit server 104 can store the live video feed in memory and provide the live video feed to the client device 126 for the owner 128 to review.

In some implementations, if power provided to or provided by the EFS 130 is interrupted while the pet 134 exists inside the boundary fence wire 132, the property owner 128 can review the video stream recorded and provided by the outdoor camera 111 to determine a cause of the failure. In addition, the property owner 128 can review the video stream to determine what dog 134 did at the time of power failure. For example, the property owner 128 can determine a direction dog 134 ran away. In another example, the property owner 128 can determine a cause of the power failure supplied to or provided by the EFS 130, such as an outside individual cutting the boundary fence wire 132 or whether the EFS 130 or EFT 115 begins due to smoke due to a power failure or broken component. This information is useful in helping the property owner 128 monitor the EFS 130 and EFT 115.

Additionally, in response to the control unit server 104 receiving a notification of the error and the sensor data, the control unit server 104 can determine the number of electronic devices (e.g., collars) corresponding to pets found on the residential property 102. For example, the control unit server 104 can transmit a notification to each collar of the pet to determine if the collar provides a response. The control unit server 104 can transmit a notification to each collar to request for locational coordinates of the collar. The locational coordinates can be GPS coordinates of the collar. The control unit server 104 can compare the received GPS coordinates of the collar to GPS coordinates of the residential property 102 and determine if the GPS coordinates of the collar are within a predetermined distance of the residential property 102. Additionally, the control unit server 104 can reach out to local authorities and the property owner 128 if the received GPS coordinates of the collar are outside the predetermined distance to indicate that a pet has left the residential property 102. In some implementations, if the control unit server 104 does not receive a notification from a collar, then the control unit server 104 can alert the local authorities and the property owner 128 that the pet's collar cannot be reached. In addition, if the control unit server 104 typically monitors a set number of pets at the residential property 102 (each pet with a corresponding collar), the control unit server 104 can compare the number of responses received from each collar to a total number of pets the control unit server 104 is monitoring at the residential property 102. If the control unit server 104 determines the number of responses received from each collar is less than the total number of pets the control unit server 104 is monitoring, this can indicate that a pet is missing.

In some implementations, the control unit server 104 can receive multiple power levels from the EFS 130 in the data indicating the error. The data can include a power level from the EFT 115, a power level provided by the EFS 130, a power level indicating an amount of power the EFS 130 receives from the electrical outlet, and a corresponding description of the issue. The control unit server 104 can compare the power level the EFS 130 receives from an electrical outlet to a standard power level for the electrical outlet, compare the power level from provided by the EFS 130 to the EFT 114 to an EFS power level, and a power level from the EFT 115 indication an amount of power the EFT 115 consumes to an EFT power level. In response to the control unit server 104 determining that any of the power levels are below their corresponding thresholds, the control unit server 104 can determine that an issue exists with either the electronic fence transmitter, the electronic fence, or the EFS 130.

The control unit server 104 can also activate a temporary bypass feature that allows a pet owner, such as property owner 128, to temporarily turn off the power supplied to the boundary fence wire 132. The temporary bypass feature instructs the EFS 130 to stop providing power to the EFT 115. This causes a chain reaction with the EFT 115 to stop providing power to the boundary fence wire 132 and allows a pet 134 to roam over the boundary created by radio signals of the boundary fence wire 132. For instance, the radio signals generated by the electricity flowing through the boundary fence wire 132 interacts with the electronic device attached to the collar of pet 134. When the electricity is turned off, the pet 134 can freely roam and cross over the boundary fence wire 132 without being shocked. In some implementations, the electricity may not be turned off but slightly reduced to a level that does not affect the pet 134. In this case, the EFS 130 can still detect when the collar of the pet 134 approaches and crosses the boundary fence wire 132 but does not deliver a shock to the collar of the pet 134. The EFS 130 may transmit a notification to the control unit server 104 indicating that the collar of the pet 134 has crossed the boundary, but the control unit server 104 may discard the notification in response to recognizing the temporary bypass feature has been activated. The property owner 128 may turn off the power supplied by the EFT 115 through an application on the client device 126. The application may send a signal to the control unit server 104 instructing the EFT 115 to shut down in response to the property owner 128 pressing a "power down" or similar feature on the client device application. In response, the control unit server 104 may send a signal to the EFT 115 over the network 122 through EFS 130 instructing the EFT 115 to power down.

Figure 4A:
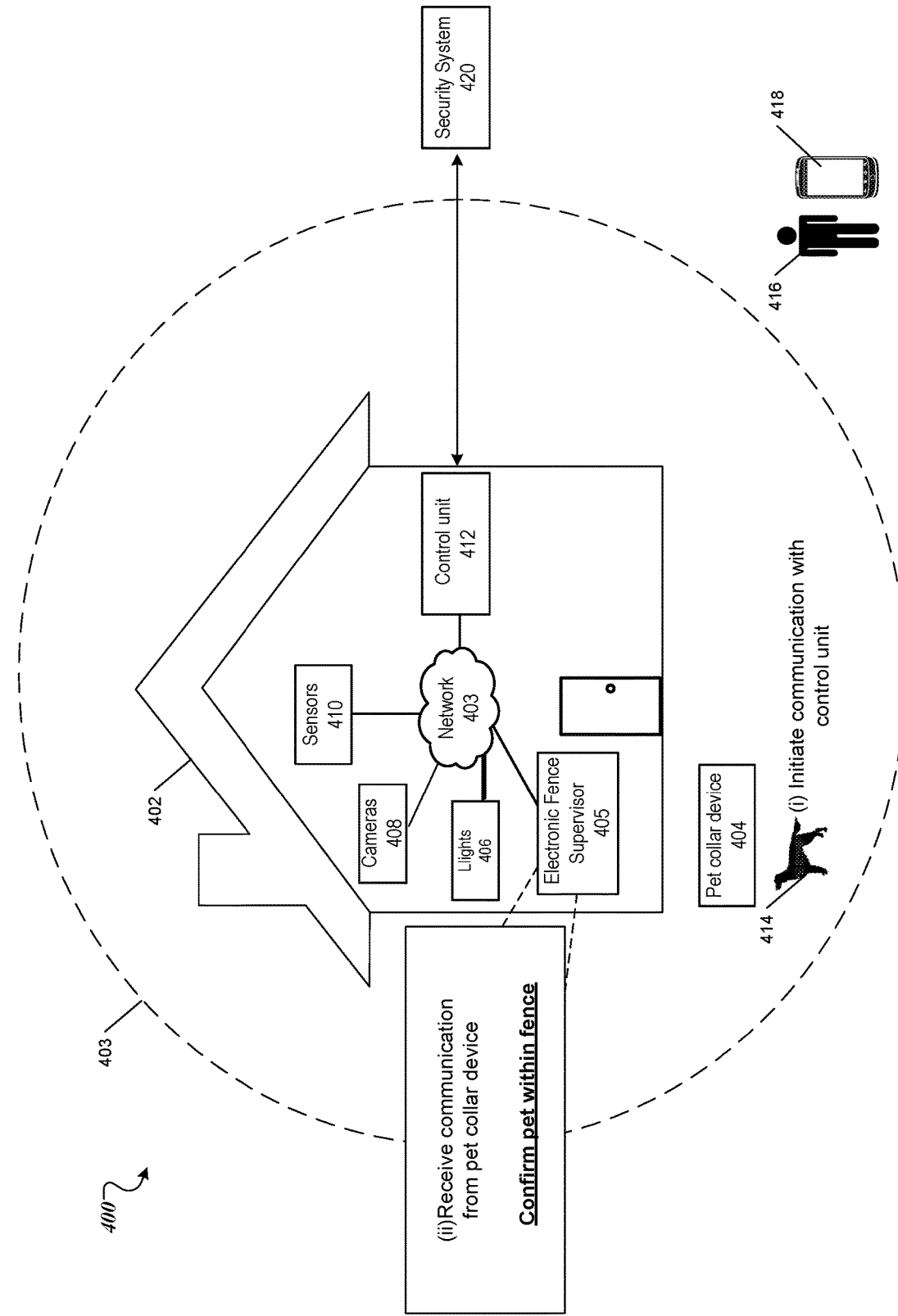
FIGS. 4A and 4B illustrate examples of a system for tracking a pet associated with a monitored property.
Figure 4B:
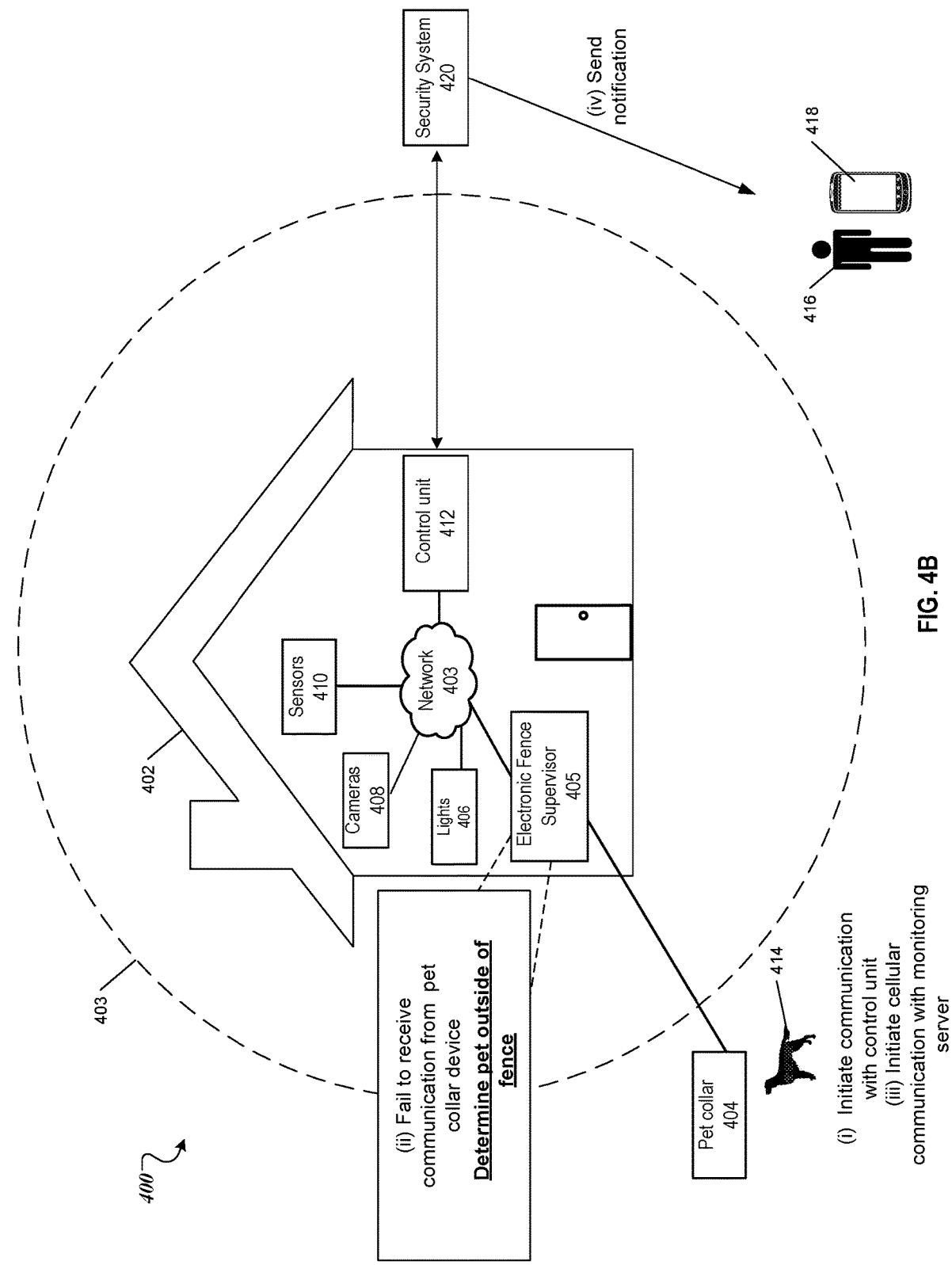

FIGS. 4A and 4B illustrate an example of system 400 for tracking a pet associated with a monitored property. As shown in FIG. 4A, a property 402 (e.g. a home) of a user 416 is monitored by an in-home security system (e.g. in-home security system) that includes components that are fixed within the property 402. The in-home monitoring system may include a control unit 412, one or more cameras 408, one or more sensors 410, one or more lights 406, and a electronic fence supervisor 405 that is in communication with an electronic pet collar device 404. The user 416 may affix an electronic pet collar device 404 to one or more pets associated with the monitored property 402. The monitored property 402 may include an electronic pet fence 403 that surrounds the property 402. The electronic fence supervisor 405 is in communication with the electric pet fence 403 around the monitored property 402. In some examples, the electronic pet fence boundary may define a predetermined geo-fence associated with the monitored property. In other examples, the predetermined geo-fence associated with the monitored property may extend past the pet fence 403 to and include the area surrounded by the electronic pet fence 403.

The electronic pet collar device 404 may include a Bluetooth Low energy radio (BTLE) and a cellular transceiver that allows the device to communicate via Bluetooth and cellular data with other connected devices and the electronic fence supervisor 405 at the monitored property 402. In some examples, the electronic pet collar device 404 may be affixed directly to the pet 414. In other examples, the electronic pet collar device 404 may be in the form of a sensor, and may be connected to a typical collar then affixed to the pet 414.

As illustrated in FIG. 4A, the electronic pet collar device 404 initiates communication with the pet collar hub device 403, which in turn communicates with the control unit 412. The control unit 412 manages the communication between the one or more sensors 410, the one or more cameras 408, and the one or more lights 406 located throughout the monitored property 402. The control unit 412 also controls the in-home security system at the monitored property 402, and communicates with a security system 420, which may be remote from the property 402. The electronic pet collar device 404 attempts to communicate with the electronic fence supervisor 405 on a periodic basis. For example, the electronic pet collar device 404 may attempt to communicate with the electronic fence supervisor 405 every five minutes, or every sixty seconds.

The electronic pet collar device 404 may attempt to communicate with the electronic fence supervisor 405 by a lower power communication method that functions only when the electronic pet collar device 404 is in proximity to the control unit 412. For example, the electronic pet collar device 404 may communicate with the electronic fence supervisor 405 through Bluetooth where the range of transmission is approximately one hundred meters. In some examples, where the area enclosed by the pet fence 403 is relatively small, the electronic pet collar device 404 may be equipped to communicate with the electronic fence supervisor 405 through Wi-Fi communication, and may attempt to periodically with the control unit 412 using Wi-Fi where the range of transmission is approximately thirty-two meters. In some examples, the electronic pet collar device 404 may communicate with the electronic fence supervisor 405 with other methods of communication, such as, Z-wave, Zigbee, or any other appropriate method of communication.

When the electronic fence supervisor 405 receives the communication from the electronic pet collar device 404 within a predetermined time period, the electronic fence supervisor 405 confirms that the pet 414 is within the geo-fence. For example, when the electronic fence supervisor 405 receives communication from the electronic pet collar device 404 within 60 seconds, the device is confirmed to be within the geo-fence. For the example illustrated in FIG. 4A, where the pet fence 403 defines a geo-fence around the monitored property 402, the electronic fence supervisor 405 confirms the pet 414 is within the pet fence 403.

In some implementations, the electronic fence supervisor 405 may attempt to communicate with the control unit 412 directly. In other implementations, the electronic pet collar device 404 may attempt to communicate with the electronic fence supervisor 405 on a periodic basis, and then the electronic fence supervisor 405 communicates with the control unit 412. In these implementations, when the control unit 412 receives communication from the electronic fence supervisor 405 within the predetermined time period, the control unit 412 confirms that the pet 414 is within the geo-fence.

In some implementations, when the electronic fence supervisor 405 confirms the electronic pet collar device 404 is within the pet fence 403, the electronic fence supervisor 405 may communicate with the control unit 412 to prompt one or more cameras 408 located throughout the monitored property 402 to capture video data to determine the location of the pet 414 within/around the monitored property 402. When the control unit 412 does not receive data from the one or more cameras 408 confirming the pet 414 is within/around the monitored property 402, the control unit 412 may communicate with the electronic fence supervisor 405 to initiate communication with the pet collar electronic device 404 to determine its GPS location. When the GPS location of the device 404 matches the location of the property 402, the electronic fence supervisor 405 may determine that the pet collar device 404 was removed from the pet 414, and the pet has been removed from the monitored property. The control unit 412 may send a notification to alert that user that the pet collar has been removed from the pet 414.

As illustrated in FIG. 4B, the electronic pet collar device 404 initiates communication with the electronic fence supervisor 405. The electronic pet collar device 404 may attempt to communicate with the electronic fence supervisor 405 at specific time periods via Bluetooth. When the electronic pet collar device 404 fails to communicate via Bluetooth with the pet collar hub device 405, the electronic pet collar device 404 may attempt to communicate with the electronic fence supervisor 405 via a different method of wireless communication. For example, the electronic pet collar device 404 may attempt to communicate with the electronic fence supervisor 405 by Wi-Fi. When the electronic pet collar device 404 fails to connect with the electronic fence supervisor 405, the electronic pet collar device 404 then initiates cellular communication with the security system 420. The security system 420 determines that the electronic pet collar device 404 is outside of the pet fence 403 when communication is received from the electronic pet collar device 404. The electronic pet collar device 404 communicates its GPS position to the security system 420.

In some implementations, when the security system 420 determines the pet 414 is outside of the pet fence 403, the security system 420 communicates this data to the control unit 412. Based on receiving data indicating that the pet 414 is outside of the pet fence 403, the control unit 412 may communicate with one or more devices at the monitored property 402 to increase the security at the monitored property 402. For example, the control unit 412 may communicate with one or more exterior cameras at the property to initiate capturing video data of the surroundings of the monitored property 402 to ensure that items are not at risk for being stolen from the property. The control unit 412 may also arm the in-home security system. The security system 420 may simultaneously send a notification to the user device 418 of the user 416 indicating that the pet 414 is outside of the fence 403. In some examples, the notification sent to the user 416 may include the determined GPS location of the electronic pet collar device 404. The security system 420 may also communicate the GPS location of the device 404 with the control unit 412.

The user 416 may set one or more rules for receiving notifications about the status of the electronic pet collar device 404. The user 416 may log into a monitoring application that runs on the user device 418 and that is managed by the security system 420. For example, the user may set preferences to receive notifications of the pet's GPS location every thirty minutes when the pet is determined to be outside of the fence. In another example, the user 416 may set preferences to receive a notification when the battery power of the electronic pet collar device 404 is below a particular threshold. For example, the user may receive a notification when the battery of the electronic collar device is low.

The user 416 may set a schedule for the frequency at which the electronic pet collar device 104 should initiate communication with the electronic fence supervisor 405 based on the armed status of the in-home security system. The user 416 may wish to increase the frequency at which the pet collar device 404 initiates communication with the pet collar hub device 405 when the in-home security system at the monitored property is armed away. For example, the user 416 may set preferences for the device 404 to communicate with the electronic fence supervisor 405 every sixty seconds when the system is armed way. The user 416 may set preferences for the device 404 to communicate with the electronic fence supervisor 405 every five minutes when the in-home security system is armed stayed.

The electronic fence supervisor 405 is associated with the pet fence 405, the electronic fence supervisor 405 is plugged into an electrical outlet, and may be configured to monitor the amount of power received from the electrical outlet. The electronic fence supervisor 405 also monitors the amount power provided to the electronic transmitter of the pet fence 403. When the hub device detects an interruption in the power used by the electronic transmitter of the pet fence 403, the electronic fence supervisor 405 determines that the pet fence 403 has failed. The electronic fence supervisor 405 may communicate the fence failure to the control unit 412. The control unit 412 communicates the fence failure to the security system 420. The security system 420 may attempt to communicate with the pet collar device 404 via cellular communication. When the security system 420 initiates communication with the pet collar device 404, the security system 420 communicates the GPS location of the pet collar device 404 to the user 416. The control unit 412 may arm the in-home security system when the electronic fence supervisor 405 determines that the pet fence 403 has failed.

When the pet fence 403 has failed, the security system 420 may communicate frequently with the electronic pet collar device 404 to ensure that the pet 414 does not vacate the monitored property 402. In these implementations, the monitoring server 420 may initiate cellular communication with the electronic pet collar device 404 to constantly track the GPS location of the pet collar device 404 and associated pet 414. When the security system 420 receives GPS coordinates that have not changed for an extended period of time, the security system 420 may communicate with the control unit 412 to ensure that the pet 414 is within the property 402. For example, the security system 420 may command the control unit 412 to prompt one or more cameras 408 at the monitored property 402 to begin to capture video data of the one or more rooms and surrounding area of the monitored property 402. When the control unit 412 determines that no one is at the monitored property 402 and the pet 414 is not within or around the property 402, the security system 420 sends a notification to the user 416 that indicates that the pet 414 has vacated the property 402.

Figure 5:
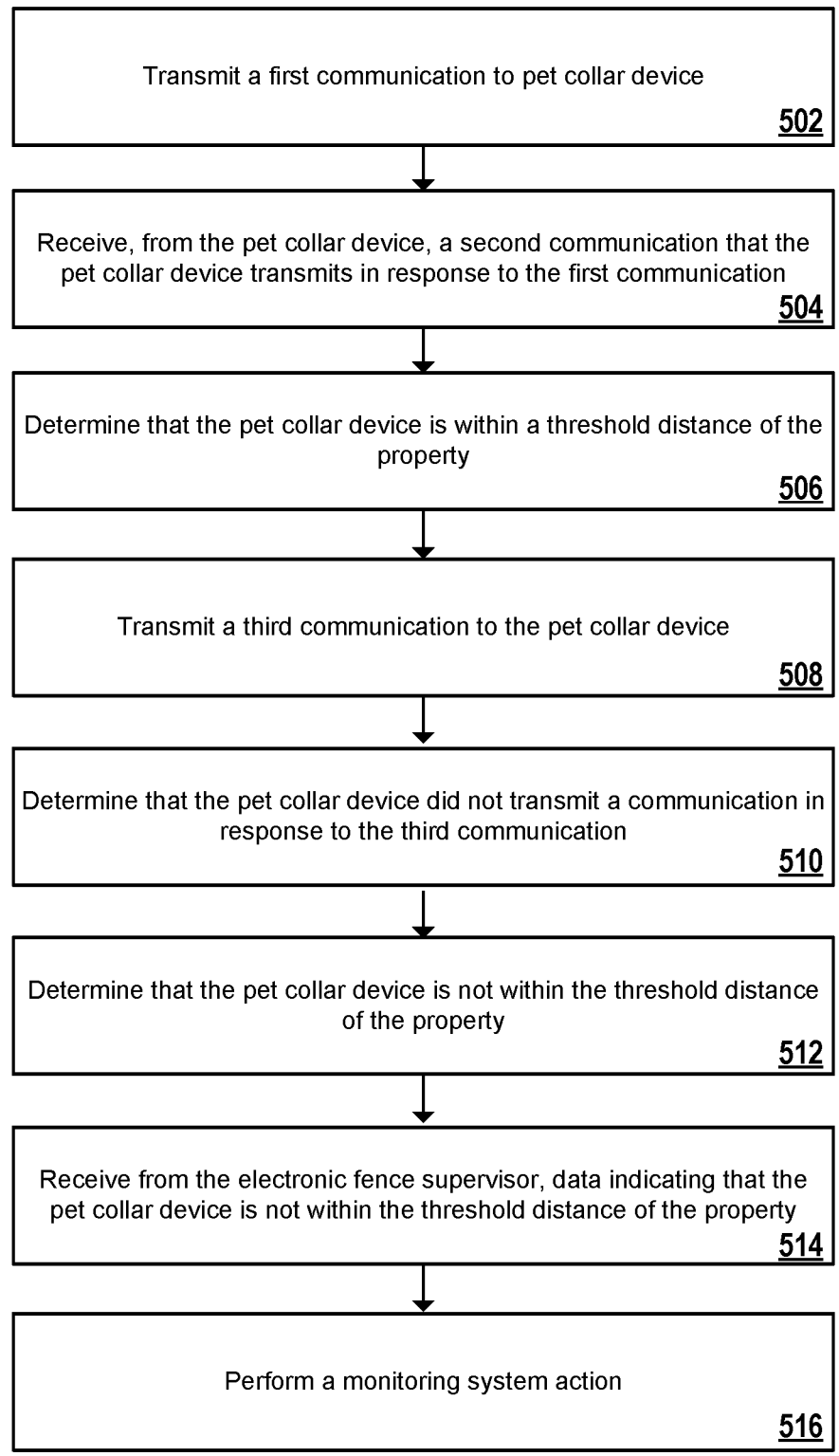
FIG. 5 illustrates an example process for performing a monitoring system action.

FIG. 5 illustrates an example process 500 for performing a monitoring system action. A monitoring system at a monitored property 402 may include a pet collar device 404 that is affixed to a pet 414 of the monitored property 402. The pet collar device 404 may be in communication with an electronic fence supervisor 405. The electronic fence supervisor 405 is configured to transmit a first communication to the pet collar device (502). The electronic fence supervisor 405 may communicate with the pet collar device 404 by a low power communication method. For example, the electronic fence supervisor 405 may transmit a Bluetooth communication to the pet collar device 404. The pet collar device 404 may be affixed directly to the pet 414 of the monitored property 402. In some examples, the pet collar device 404 may be in the form of a sensor, and may be connected to a typical pet collar, which is then affixed to the pet 414. The pet collar device 404 may include a Bluetooth Low energy radio (BTLE) that allows the device to communicate via Bluetooth, and may include a cellular transceiver that allows the device to communicate via cellular data. In some examples, the pet collar device 404 may include one or more other communication radios.

The electronic fence supervisor receives, from the pet collar device, a second communication that the pet collar device transmits in response to the first communication (504). The pet collar device 404 receives the first communication from the electronic fence supervisor 405 and transmits a second communication to the electronic fence supervisor 405 in response to receiving the first communication. The first and second communication may each be low power communications that are operable only when the pet collar device 404 is within a threshold distance from the electronic fence supervisor 405. For example, the electronic fence supervisor 405 may communicate with the pet collar device 404 via Wi-Fi communication. In other examples, the electronic fence supervisor 405 may communicate with the pet collar device 404 via other methods of communication, such as, Z-wave, Zigbee, or any other appropriate method of communication.

The electronic fence supervisor determines that the pet collar device is within a threshold distance of the property based on receiving the second communication (506). When the pet collar device 404 successfully communicates with the electronic fence supervisor 405, the electronic fence supervisor 405 may confirm that the pet collar 404 is within a threshold distance of the property 402. The electronic fence supervisor 405 transmits a third communication to the pet collar device (508). The electronic fence supervisor 405 continuously communicates with the pet collar device 404 to ensure that the device 404 is still within the threshold distance of the monitored property 402.

The electronic fence supervisor determines that the pet collar device did not transmit a communication in response to the third communication after a predetermined time has elapsed (510). The predetermined time may be a user set time period. For example, the resident of the monitored property 402 may configure the predetermined time period to be sixty seconds. In some examples, the predetermined time may be determined by the system. In these examples, the monitoring control unit 412 may determine the predetermined time period based on the current armed status of the monitoring system. When the monitoring control unit 412 determines that the monitoring system is armed, the electronic fence supervisor 405 may increase the length of the predetermined time period based on the monitoring system being armed. For example, the monitoring control unit 412 may increase the predetermined time period from thirty second to sixty seconds. Based on increasing the length of the predetermined time period, the electronic fence supervisor 405 communicates with the pet collar device 404 less frequently when the property is armed. When the monitoring control unit 412 determines that the monitoring system is unarmed, the electronic fence supervisor 405 decreases the length of the predetermined time period based on the monitoring system being armed. Based on decreasing the length of the predetermined time period, the electronic fence supervisor 405 communicates with the pet collar device 404 more frequently.

The electronic fence supervisor determines that the pet collar device is not within the threshold distance of the property based on determining that the pet collar device did not transmit a communication in response to the third communication (512). When the pet collar device 404 fails to communicate with the electronic fence supervisor 405, the electronic fence supervisor 405 determines that the pet collar 404 is not within a threshold distance of the property 402. The monitoring control unit 412 receives data indicating that the pet collar device 404 is not within the threshold distance of the property from the electronic fence supervisor (514). The electronic fence supervisor 405 communicates with the monitoring control unit 412 when the electronic fence supervisor 405 determines that the pet collar 404 is not within the threshold distance of the property 402.

The monitoring control unit performs a monitoring system action based on receiving data indicating that the pet collar device is not within the threshold distance of the property (516). The monitoring control unit 412 may perform a monitoring system action by activating a camera located at the monitored property 402. The monitoring control unit 412 may communicate with a camera to prompt the camera to initiate capturing image data. In some examples, the monitoring control unit 412 may communicate activate the one or more cameras located throughout the monitored property 402. Each of the one or more cameras may capture image data to determine the current conditions at the property 402. The monitoring control unit 412 may perform a monitoring system action by initiating a fourth communication with the pet collar device 404. The fourth communication may be a different mode of communication than the first communication and the second communication. For example, the monitoring control unit 412 may initiate cellular communication with the pet collar device 404. When the monitoring control unit 412 initiates cellular communication with the pet collar device 404, the pet collar device 404 receives the cellular communication even when outside of the threshold distance from the monitored property 402. Based on communicating with the pet collar device 404, the monitoring control unit 412 receives the GPS location of the device 404. The monitoring control unit 412 may perform a monitoring system action by communicating a notification to the user device of a resident of the monitored property 402. The notification may indicate to the resident that the pet collar device 404 is not within the threshold distance of the property 402, and may include the GPS coordinates of the pet collar device 404.

In some implementations, when the electronic fence supervisor 405 determines that the pet collar device 404 is within a threshold distance of the monitored property 402, the electronic fence supervisor 405 communicates with the monitoring control unit 412. Based on receiving data that indicates that the pet collar device 404 is within the threshold distance of the monitored property, the monitoring control unit 412 may communicate with one or more cameras located throughout the property 402. The one or more cameras may capture image data of the different areas of the monitored property 402. When the one or more cameras fail to capture image data that includes an image of the pet, the monitoring control unit 412 may determine that the pet collar device 404 was likely removed from the pet 414 based on determining that the pet collar device 404 is within the threshold distance of the property 402, and the pet 414 is not located at the property 402. The monitoring control unit 412 perform a monitoring system action by communicating a notification to the user device of the resident of the property 402. The notification may indicate that the pet collar device 404 was likely removed from the pet 414, and the pet 414 is not located at the property 402. In some implementations, the monitoring control unit 412 may perform a monitoring system by outputting an audible alarm at the property 402.

Figure 6:
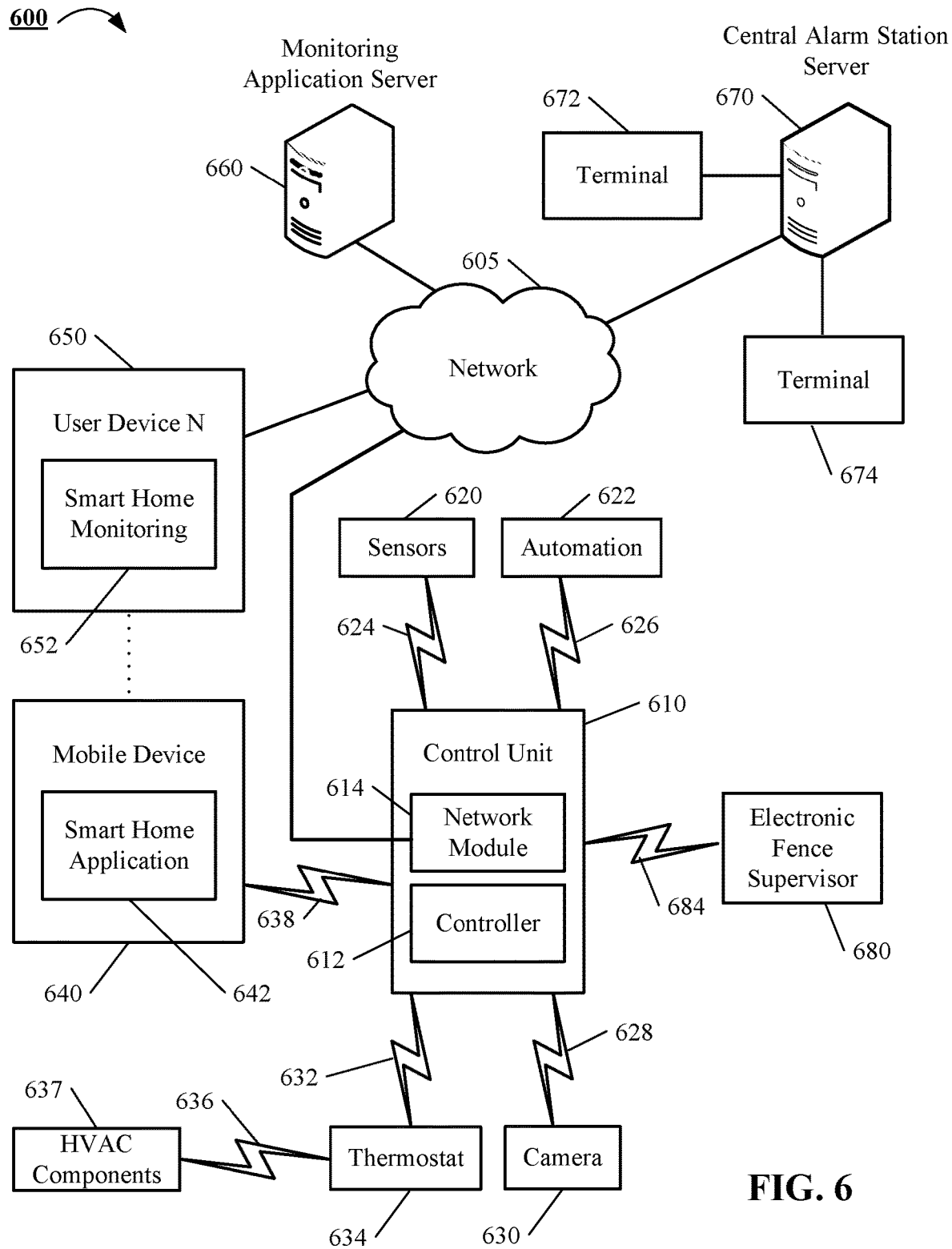
FIG. 6 is a block diagram of an example integrated security system for monitoring an electronic pet fence at a residential facility that may utilize various security components.

FIG. 6 is a block diagram of an example integrated security system 600 for monitoring an electronic pet fence at a residential facility that may utilize various security components. The electronic system 600 includes a network 605, a control unit 610, one or more user devices 640 and 650, a monitoring application server 660, and a central alarm station server 670. In some examples, the network 605 facilitates communications between the control unit 610, the one or more user devices 640 and 650, the monitoring application server 660, and the central alarm station server 670.

The network 605 is configured to enable exchange of electronic communications between devices connected to the network 605. For example, the network 605 may be configured to enable exchange of electronic communications between the control unit 610, the one or more user devices 640 and 650, the monitoring application server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The control unit 610 includes a controller 612 and a network module 614. The controller 612 is configured to control a control unit monitoring system (e.g., a control unit system) that includes the control unit 610. In some examples, the controller 612 may include a processor or other control circuitry configured to execute instructions of a program that controls operation of a control unit system. In these examples, the controller 612 may be configured to receive input from sensors, flow meters, or other devices included in the control unit system and control operations of devices included in the household (e.g., speakers, lights, doors, etc.). For example, the controller 612 may be configured to control operation of the network module 614 included in the connected valve unit 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the connected valve unit 610 to communicate over a local area network and/or the Internet. The network module 614 also may be a voiceband modem configured to enable the alarm panel to communicate over the telephone lines of Plain Old Telephone Systems (POTS).

The control unit system that includes the control unit 610 includes one or more sensors. For example, the monitoring system may include multiple sensors 620. The sensors 620 may include a lock sensor, a contact sensor, a motion sensor, or any other type of sensor included in a control unit system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors

620 may include a radio-frequency identification (RFID) sensor that identifies a particular article that includes a pre-assigned RFID tag.

The control unit 610 communicates with the module 622 and the camera 630 to perform monitoring. The module 622 is connected to one or more devices that enable home automation control. For instance, the module 622 may be connected to one or more lighting systems and may be configured to control operation of the one or more lighting systems. Also, the module 622 may be connected to one or more electronic locks at the property and may be configured to control operation of the one or more electronic locks (e.g., control Z-Wave locks using wireless communications in the Z-Wave protocol. Further, the module 622 may be connected to one or more appliances at the property and may be configured to control operation of the one or more appliances. The module 622 may include multiple modules that are each specific to the type of device being controlled in an automated manner. The module 622 may control the one or more devices based on commands received from the control unit 610. For instance, the module 622 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building or within a residential facility 102 monitored by the control unit 610. The camera 630 may be configured to capture single, static images of the area and also video images of the area in which multiple images of the area are captured at a relatively high frequency (e.g., thirty images per second). The camera 630 may be controlled based on commands received from the control unit 610.

The camera 630 may be triggered by several different types of techniques. For instance, a Passive Infra-Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the module 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the connected valve unit 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring application server 660 over the Internet. In these implementations, image data captured by the camera 630 does not pass through the connected valve unit 610 and the camera 630 receives commands related to operation from the monitoring application server 660.

The system 600 also includes thermostat 634 to perform dynamic environmental control at the property. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a property and/or environmental data at a property, e.g., at various locations indoors and outdoors at the property. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the connected valve unit 610 and can control the environmental (e.g., temperature) settings based on commands received from the connected valve unit 610.

In some implementations, the thermostat 634 is a dynamically programmable thermostat and can be integrated with the control unit 610. For example, the dynamically programmable thermostat 634 can include the control unit 610, e.g., as an internal component to the dynamically programmable thermostat 634. In addition, the control unit 610 can be a gateway device that communicates with the dynamically programmable thermostat 634.

A module 637 is connected to one or more components of an HVAC system associated with a property, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

In some examples, the system 600 further includes one or more robotic devices. The robotic devices may be any type of robots that are capable of moving and taking actions that assist in security monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the monitoring system 600 for use in appropriate circumstances. For instance, a robotic vacuum cleaner device may be associated with the monitoring system 600 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 610, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 610. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 600. For instance, after completion of a monitoring operation or upon instruction by the control unit 610, the robotic devices may be configured to automatically fly to and land on one of the charging stations. In this regard, the robotic devices may automatically maintain a fully charged battery in a state in which the robotic devices are ready for use by the monitoring system 600.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 610 references a stored table of the occupancy status of each charging station and instructs the robotic device to navigate to the nearest charging station that is unoccupied.

The system 600 further includes an electronic fence supervisor 680. The electronic fence supervisor may include any type of device used to provide alerts based on received sensory data. For instance, the one or more control units 610 may receive one or more alerts from the electronic fence supervisor. Additionally, the one or more control units 610 may receive one or more sensory data from the sensors 620 and determine whether to provide an alert to the electronic fence supervisor 680.

The sensors 620, the module 622, the camera 630, the thermostat 634, and the electronic fence supervisor 680 communicate with the controller 612 over communication links 624, 626, 628, 632, and 684. The communication links 624, 626, 628, 632, and 684, may be a wired or wireless data pathway configured to transmit signals from the sensors 620, the module 622, the camera 630, the thermostat 634, and the electronic fence supervisor 680 to the controller 612. The sensors 620, the module 622, the camera 630, the thermostat 634, and the electronic fence supervisor 680 may continuously transmit sensed values to the controller 612, periodically transmit sensed values to the controller 612, or transmit sensed values to the controller 612 in response to a change in a sensed value.

The communication links 624, 626, 628, 632, 636, and 684 may include a local network. The sensors 620, the module 622, the camera 630, the thermostat 634, and the electronic fence supervisor 680, and the controller 612 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 660 is an electronic device configured to provide monitoring services by exchanging electronic communications with the control unit 610, the one or more user devices 640 and 650, and the central alarm station server 670 over the network 605. For example, the monitoring application server 660 may be configured to monitor events (e.g., alarm events) generated by the control unit 610. In this example, the monitoring application server 660 may exchange electronic communications with the network module 614 included in the control unit 610 to receive information regarding events (e.g., alerts) detected by the control unit 610. The monitoring application server 660 also may receive information regarding vents (e.g., alerts) from the one or more user devices 640 and 650.

In some examples, the monitoring application server 660 may route alert data received from the network module 614 or the one or more user devices 640 and 650 to the central alarm station server 670. For example, the monitoring application server 660 may transmit the alert data to the central alarm station server 670 over the network 605.

The monitoring application server 660 may store sensor and image data received from the monitoring system and perform analysis of sensor and image data received from the monitoring system. Based on the analysis, the monitoring application server 660 may communicate with and control aspects of the control unit 610 or the one or more user devices 640 and 650.

The central alarm station server 670 is an electronic device configured to provide alarm monitoring service by exchanging communications with the control unit 610, the one or more mobile devices 640 and 650, and the monitoring application server 660 over the network 605. For example, the central alarm station server 670 may be configured to monitor alerting events generated by the control unit 610. In this example, the central alarm station server 670 may exchange communications with the network module 614 included in the control unit 610 to receive information regarding alerting events detected by the control unit 610. The central alarm station server 670 also may receive information regarding alerting events from the one or more mobile devices 640 and 650 and/or the monitoring application server 660.

The central alarm station server 670 is connected to multiple terminals 672 and 674. The terminals 672 and 674 may be used by operators to process alerting events. For example, the central alarm station server 670 may route alerting data to the terminals 672 and 674 to enable an operator to process the alerting data. The terminals 672 and 674 may include general-purpose computers (e.g., desktop personal computers, workstations, or laptop computers) that are configured to receive alerting data from a server in the central alarm station server 670 and render a display of information based on the alerting data. For instance, the controller 612 may control the network module 614 to transmit, to the central alarm station server 670, alerting data indicating that a sensor 620 detected motion from a motion sensor via the sensors 620. The central alarm station server 670 may receive the alerting data and route the alerting data to the terminal 672 for processing by an operator associated with the terminal 672. The terminal 672 may render a display to the operator that includes information associated with the alerting event (e.g., the lock sensor data, the motion sensor data, the contact sensor data, etc.) and the operator may handle the alerting event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more user devices 640 and 650 are devices that host and display user interfaces. For instance, the user device 640 is a mobile device that hosts one or more native applications (e.g., the smart home application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a smart home application 642. The smart home application 642 refers to a software/firmware program running on the corresponding mobile device that enables the user interface and features described throughout. The user device 640 may load or install the smart home application 642 based on data received over a network or data received from local media. The smart home application 642 runs on mobile devices platforms, such as iPhone, iPod touch, Blackberry, Google Android, Windows Mobile, etc. The smart home application 642 enables the user device 640 to receive and process image and sensor data from the monitoring system.

The user device 650 may be a general-purpose computer (e.g., a desktop personal computer, a workstation, or a laptop computer) that is configured to communicate with the monitoring application server 660 and/or the control unit 610 over the network 605. The user device 650 may be configured to display a smart home user interface 652 that is generated by the user device 650 or generated by the monitoring application server 660. For example, the user device 650 may be configured to display a user interface (e.g., a web page) provided by the monitoring application server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640 and 650 communicate with and receive monitoring system data from the control unit 610 using the communication link 638. For instance, the one or more user devices 640 and 650 may communicate with the control unit 610 using various local wireless protocols such as Wi-Fi, Bluetooth, Zwave, Zigbee, HomePlug (ethernet over powerline), or wired protocols such as Ethernet and USB, to connect the one or more user devices 640 and 650 to local security and automation equipment. The one or more user devices 640 and 650 may connect locally to the monitoring system and its sensors and other devices. The local connection may improve the speed of status and control communications because communicating through the network 605 with a remote server (e.g., the monitoring application server 660) may be significantly slower.

Although the one or more user devices 640 and 650 are shown as communicating with the control unit 610, the one or more user devices 640 and 650 may communicate directly with the sensors and other devices controlled by the control unit 610. In some implementations, the one or more user devices 640 and 650 replace the control unit 610 and perform the functions of the control unit 610 for local monitoring and long range/offsite communication.

In other implementations, the one or more user devices 640 and 650 receive monitoring system data captured by the control unit 610 through the network 605. The one or more user devices 640, 650 may receive the data from the control unit 610 through the network 605 or the monitoring application server 660 may relay data received from the control unit 610 to the one or more user devices 640 and 650 through the network 05. In this regard, the monitoring application server 660 may facilitate communication between the one or more user devices 640 and 650 and the monitoring system.

In some implementations, the one or more user devices 640 and 650 may be configured to switch whether the one or more user devices 640 and 650 communicate with the control unit 610 directly (e.g., through link 638) or through the monitoring application server 660 (e.g., through network 605) based on a location of the one or more user devices 640 and 650. For instance, when the one or more user devices 640 and 650 are located close to the control unit 610 and in range to communicate directly with the control unit 610, the one or more user devices 640 and 650 use direct communication. When the one or more user devices 640 and 650 are located far from the control unit 610 and not in range to communicate directly with the control unit 610, the one or more user devices 640 and 650 use communication through the monitoring application server 660.

Although the one or more user devices 640 and 650 are shown as being connected to the network 605, in some implementations, the one or more user devices 640 and 650 are not connected to the network 605. In these implementations, the one or more user devices 640 and 650 communicate directly with one or more of the monitoring system components and no network (e.g., Internet) connection or reliance on remote servers is needed.

In some implementations, the one or more user devices 640 and 650 are used in conjunction with only local sensors and/or local devices in a house. In these implementations, the system 600 only includes the one or more user devices 640 and 650, the sensors 620, the module 622, the camera 630, and the robotic devices. The one or more user devices 640 and 650 receive data directly from the sensors 620, the module 622, the camera 630, and the robotic devices and sends data directly to the sensors 620, the module 622, the camera 630, and the robotic devices. The one or more user devices 640, 650 provide the appropriate interfaces/processing to provide visual surveillance and reporting.

In other implementations, the system 600 further includes network 605 and the sensors 620, the module 622, the camera 630, the thermostat 634, and the robotic devices are configured to communicate sensor and image data to the one or more user devices 640 and 650 over network 605 (e.g., the Internet, cellular network, etc.). In yet another implementation, the sensors 620, the module 622, the camera 630, the thermostat 634, and the robotic devices (or a component, such as a bridge/router) are intelligent enough to change the communication pathway from a direct local pathway when the one or more user devices 640 and 650 are in close physical proximity to the sensors 620, the module 622, the camera 630, the thermostat 634, and the robotic devices to a pathway over network 605 when the one or more user devices 640 and 650 are farther from the sensors 620, the module 622, the camera 630, the thermostat 634, and the robotic devices. In some examples, the system leverages GPS information from the one or more user devices 640 and 650 to determine whether the one or more user devices 640 and 650 are close enough to the sensors 620, the module 622, the camera 630, the thermostat 634, and the robotic devices to use the direct local pathway or whether the one or more user devices 640 and 650 are far enough from the sensors 620, the module 622, the camera 630, the thermostat 634, and the robotic devices that the pathway over network 605 is required. In other examples, the system leverages status communications (e.g., pinging) between the one or more user devices 640 and 650 and the sensors 620, the module 622, the camera 630, the thermostat 634, and the robotic devices to determine whether communication using the direct local pathway is possible. If communication using the direct local pathway is possible, the one or more user devices 640 and 650 communicate with the sensors 620, the module 622, the camera 630, the thermostat 634, and the robotic devices using the direct local pathway. If communication using the direct local pathway is not possible, the one or more user devices 640 and 650 communicate with the sensors 620, the module 622, the camera 630, the thermostat 634, and the robotic devices using the pathway over network 605.

In some implementations, the system 600 provides end users with access to images captured by the camera 630 to aid in decision making. The system 600 may transmit the images captured by the camera 630 over a wireless WAN network to the user devices 640 and 650. Because transmission over a wireless WAN network may be relatively expensive, the system 600 uses several techniques to reduce costs while providing access to significant levels of useful visual information.

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "Away" state, but set not to capture images when the alarm system is armed in a "Stay" state or disarmed. In addition, the camera 630 may be triggered to begin capturing images when the alarm system detects an event, such as an alarm event, a door-opening event for a door that leads to an area within a field of view of the camera 630, or motion in the area within the field of view of the camera 630. In other implementations, the camera 630 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
   a sensor that is located at the property and that is configured to generate sensor data;
   an electronic fence transmitter that is configured to detect movement of an electronic device across an electronic fence;
   an electronic fence supervisor that is configured to:
      detect an error in the electronic fence transmitter or the electronic fence;
      in response to detecting the error, generate data indicating the error; and
   a monitor control unit that is configured to:
      receive the data indicating the error and the sensor data;
      based on the data indicating the error and the sensor, select, from among multiple monitoring system actions, a monitoring system action; and
      perform the monitoring system action.

2. The monitoring system of claim 1, comprising:
   a camera that is configured to generate image data,
   wherein the monitor control unit is configured to:
      receive data indicating the error and the sensor data by receiving the data indicating the error and the sensor data that indicates movement in a particular area near the electronic fence;
      determine that the camera is trained on the particular area near the electronic fence;
      obtain, from the camera, the image data;
      select a monitoring system action by selecting an action to transmit the image data to a resident of the property; and
      perform the monitoring system action by transmitting the image data to the resident of the property.

3. The monitoring system of claim 1, wherein:
   the electronic fence supervisor and the electronic fence connect to the electronic fence in series, and
   the electronic fence transmitter provides power to the electronic fence.

4. The monitoring system of claim 1, wherein the electronic fence comprises a wire loop that is configured to generate radio frequencies that interact with the electronic device.

5. The monitoring system of claim 1, wherein:
   the electronic fence supervisor is configured to:

detect an error in the electronic fence transmitter or the electronic fence by detecting a break in a wire of the electronic fence;

generate data indicating the error by generating data indicating the break in the wire of the electronic fence;

the monitor control unit is configured to:

receive the data indicating the error and the sensor data by receiving the data indicating the break in the wire of the electronic fence;

select the monitoring system action based on the data indicating the break in the wire of the electronic fence and the sensor data.

6. The monitoring system of claim 1, wherein:

the electronic fence supervisor is configured to:

detect an error in the electronic fence transmitter or the electronic fence by determining that an amount of power consumed by the electronic fence transmitter does not satisfy a power consumption threshold;

generate data indicating the error by generating data indicating that the amount of power consumed by the electronic fence transmitter does not satisfy the power consumption threshold;

the monitor control unit is configured to:

receive the data indicating the error and the sensor data by receiving the data indicating that the amount of power consumed by the electronic fence transmitter does not satisfy the power consumption threshold;

select the monitoring system action based on the data indicating that the amount of power consumed by the electronic fence transmitter does not satisfy the power consumption threshold.

7. The monitoring system of claim 1, wherein the monitor control unit is configured to:

based on the sensor data, determine that pet door of the property has been opened; and select the monitoring system action based on determining that the pet door of the property has been opened and the data indicating the error in the electronic fence transmitter or the electronic fence.

8. The monitoring system of claim 1, wherein the multiple monitoring system actions comprise:

providing a notification to a resident of the property;

generating an alarm;

activating a camera that is trained on an area of electronic fence; and identifying image data that was captured when the error in the electronic fence transmitter or the electronic fence was detected.

9. The monitoring system of claim 1, wherein the electronic fence supervisor is configured to:

receive a request to deactivate the electronic fence;

in response to the request to deactivate the electric fence, cease providing power to the electronic fence transmitter; and after a predetermined period of time has elapsed, provide power to the electronic fence transmitter.

10. The monitoring system of claim 9, wherein the predetermined period of time is based on:

an arming status of the monitoring system;

the sensor data; or a request from a resident of the property.

* * * * *